United States Patent
Zhang et al.

(10) Patent No.: US 12,196,361 B2
(45) Date of Patent: Jan. 14, 2025

(54) INSTALLATION SUPPORT COMPATIBLE WITH MULTIPLE INSTALLATION MODES

(71) Applicant: Vertiv Corporation, Columbus, OH (US)

(72) Inventors: Xiang Zhang, Shenzhen (CN); Xin Xiang, Shenzhen (CN)

(73) Assignee: Vertiv Corporation, Columbus, OH (US)

( * ) Notice: Subject to any disclaimer, the term of this patent is extended or adjusted under 35 U.S.C. 154(b) by 10 days.

(21) Appl. No.: 18/025,855

(22) PCT Filed: Dec. 10, 2020

(86) PCT No.: PCT/CN2020/135059
§ 371 (c)(1),
(2) Date: Mar. 10, 2023

(87) PCT Pub. No.: WO2022/052342
PCT Pub. Date: Mar. 17, 2022

(65) Prior Publication Data
US 2023/0349509 A1   Nov. 2, 2023

(30) Foreign Application Priority Data

Sep. 11, 2020   (CN) .......................... 202021990577.9

(51) Int. Cl.
*F16M 13/02*   (2006.01)
*F16M 11/04*   (2006.01)

(52) U.S. Cl.
CPC ............ *F16M 13/02* (2013.01); *F16M 11/04* (2013.01)

(58) Field of Classification Search
CPC ....... F16M 13/02; F16M 11/04; F16M 13/022
(Continued)

(56) References Cited

U.S. PATENT DOCUMENTS 1,777,884 A  * 10/1930  Horix .......................... B62J 6/02
                                                        248/230.5
3,347,505 A  * 10/1967  Menser ................... F16L 3/245
                                                        248/300

(Continued)

FOREIGN PATENT DOCUMENTS

CN       202708522 U    1/2013
CN       203395546 U    1/2014
(Continued)

OTHER PUBLICATIONS

International Search Report (English and Chinese) issued in PCT/CN2020/135059, mailed Jun. 9, 2021; ISA/CN.

*Primary Examiner* — Eret C McNichols
*Assistant Examiner* — Michael McDuffie
(74) *Attorney, Agent, or Firm* — Harness, Dickey & Pierce, P.L.C.

(57) ABSTRACT

An installation support compatible with multiple installation modes, comprising a pole holding member (1), a pole-holding and wall-hanging integrated member (2), and a hanging member (3) that is detachably fixed to outdoor equipment. The hanging member (3) is detachably hung on the pole-holding and wall-hanging integrated member (2). The pole-holding and wall-hanging integrated member (2) can be independently and detachably installed on a wall body, or is enclosed with the pole holding member (1) to tightly hold a holding pole and is detachably fixed to the pole holding member (1), such that wall-hanging installation and pole-holding installation can be realized, the cost is lowered, and moreover, the field layout is simplified. Furthermore, in order to further be compatible with flush installation and flag installation of equipment, at least two hanging members (3) can be hung on each pole-holding and wall-hanging integrated member (2) side by side, and the support can further comprise an assembling member (4). In this way, a single set (Continued)

of installation support can satisfy four installation modes of pole-holding flush installation, pole-holding flag installation, wall-hanging flush installation and wall-hanging flag installation of the outdoor equipment simultaneously; the cost can be further lowered, and the field layout is simplified.

11 Claims, 8 Drawing Sheets

(58) Field of Classification Search
USPC .......... 248/58, 62, 65, 72, 229.14, 558, 689, 248/230.1, 230.5
See application file for complete search history.

(56) References Cited

U.S. PATENT DOCUMENTS

| | | | | |
|---|---|---|---|---|
| 3,944,175 A * | 3/1976 | Kearney | ................ | E21F 17/02 |
| | | | | 248/62 |
| 6,664,937 B2 * | 12/2003 | Vermette | ............. | H01Q 1/1228 |
| | | | | 343/882 |
| 6,719,255 B2 * | 4/2004 | Chen | ...................... | H04R 1/026 |
| | | | | 248/323 |
| 7,918,425 B2 * | 4/2011 | Rathbone | ............ | H01Q 1/1228 |
| | | | | 343/890 |
| 8,083,192 B2 * | 12/2011 | Wells | ................. | G09F 15/0018 |
| | | | | 248/219.3 |
| 9,038,968 B2 * | 5/2015 | Hennon | ................. | F16L 3/222 |
| | | | | 248/65 |
| 9,810,369 B2 | 11/2017 | Lilieholm et al. | | |
| 10,476,129 B2 * | 11/2019 | Woodling | ............ | H01Q 1/1228 |
| 10,526,810 B1 * | 1/2020 | Boos | ....................... | E04H 12/32 |
| 11,621,548 B2 * | 4/2023 | Heath | ...................... | H02G 7/20 |
| | | | | 174/45 R |
| 11,682,823 B2 * | 6/2023 | Udagave | .................. | F16B 2/12 |
| | | | | 343/757 |
| 11,698,087 B2 * | 7/2023 | Tsorng | .................. | F16B 5/0685 |
| | | | | 343/890 |
| 2013/0139359 A1 * | 6/2013 | Otten | ........................ | F16L 1/24 |
| | | | | 24/457 |
| 2014/0252185 A1 * | 9/2014 | Lilieholm | ............ | H01Q 1/1207 |
| | | | | 248/200 |
| 2015/0280307 A1 * | 10/2015 | Lin | ...................... | H01Q 1/1264 |
| | | | | 248/230.5 |
| 2016/0131347 A1 * | 5/2016 | Hill | ....................... | F16B 7/0493 |
| | | | | 248/219.4 |
| 2016/0152172 A1 * | 6/2016 | Eboli | ..................... | B60R 11/00 |
| | | | | 248/230.5 |
| 2019/0203878 A1 * | 7/2019 | Deng | ....................... | H04B 1/38 |
| 2022/0344798 A1 * | 10/2022 | Park | ....................... | H01Q 1/125 |

FOREIGN PATENT DOCUMENTS

| | | |
|---|---|---|
| CN | 104075097 A | 10/2014 |
| CN | 204284831 U | 4/2015 |
| CN | 204717296 U | 10/2015 |
| CN | 205560200 U | 9/2016 |
| CN | 107816613 A | 3/2018 |
| CN | 208025102 U | 10/2018 |

* cited by examiner

INSTALLATION SUPPORT COMPATIBLE WITH MULTIPLE INSTALLATION MODES

This application is a U.S. National Phase Application under 35 U.S.C. 371 of International Application No. PCT/CN2020/135059, filed Dec. 10, 2020, which claims priority to the Chinese patent application No. 202021990577.9, titled "INSTALLATION SUPPORT COMPATIBLE WITH MULTIPLE INSTALLATION MODES" and filed with the China National Intellectual Property Administration on Sep. 11, 2020, the entire contents of which are incorporated herein by reference.

FIELD

The present disclosure relates to the technical field of installation support of outdoor devices, and in particular to an installation support compatible with multiple installation modes.

BACKGROUND

Many current outdoor products (such as natural cooling power supply modules, RRU, outdoor lithium batteries, etc.) are mounted directly on poles or walls using a single product. If it is necessary to support the operation of high-power devices, multiple sets of modules or batteries are required to support the operation of large loads. Multiple devices need to be equipped with multiple installation supports, causing inconvenience to on-site installation. Moreover, there are some further problems, such as large occupying area, low space utilization rate, confusion of on-site wiring, difficulty in operation and so on, caused by scattered installation of multiple groups of devices.

SUMMARY

The technical problem to be solved by the present disclosure is that: in view of the many defects of the above-mentioned single installation support of the conventional technology, an installation support compatible with multiple installation modes is provided.

The technical solution used in the present disclosure to solve its technical problems is: constructing an installation support compatible with multiple installation modes, comprising a holding rod piece, a holding rod hanging wall integral piece and a hanging piece for detachable fixation with outdoor devices; wherein the hanging piece is detachably attached to the holding rod hanging wall integral piece; wherein the holding rod hanging wall integral piece can be separately and detachably installed on a wall, or the holding rod hanging wall integral piece and the holding rod piece encircle together to hold a holding rod tightly and the holding rod hanging wall integral piece is detachably fixed with the holding rod piece.

Preferably, the hanging piece is provided with a first assembly hole, the holding rod hanging wall integral piece is provided with a second assembly hole, and the hanging piece and the holding rod hanging wall integral piece are detachably fixed by a locking piece passing through the first assembly hole and the second assembly hole.

Preferably, each holding rod hanging wall integral piece can be mounted with at least two hanging pieces side by side, the hanging piece is provided with a plurality of first device mounting holes for connecting to the outdoor device, the hanging piece further comprises a downward bending hook lug, the holding rod hanging wall integral piece is provided with a hook lug positioning groove, and the hook lug hangs into the hook lug positioning groove.

Preferably, the holding rod hanging wall integral piece is provided with a hanging wall mounting hole, and the hanging wall mounting hole is matched with an expansion screw driven into the wall to realize a hanging wall installation of the holding rod hanging wall integral piece.

Preferably, the holding rod hanging wall integral piece comprises a notch for being attached with the holding rod, the holding rod piece comprises an arched surface for being attached with the holding rod, the arched surface is provided with a friction structure for increasing friction, the holding rod hanging wall integral piece is provided with a third assembly hole, the holding rod piece is provided with a fourth assembly hole on each of two sides of the arched surface, and the holding rod piece and the holding rod hanging wall integral piece are detachably fixed by a locking piece passing through the third assembly hole and the fourth assembly hole so that the notch and the arched surface encircle together to hold the holding rod tightly.

Preferably, one of the fourth assembly holes is a first non-closed hole with an open inlet, the inlet of the first non-closed hole is located at a vertical edge of the holding rod piece, and the locking piece fixed on the holding rod hanging wall integral piece can enter from the inlet of the first non-closed hole and slide into a closed end of the first non-closed hole.

Preferably, the holding rod hanging wall integral piece is further provided with at least one pair of throat hoop limiting holes, and each pair of throat hoop limiting holes are used for one throat hoop for holding the holding rod tightly to pass through.

Preferably, the installation support further comprises an assembling piece which is arranged between two stacked outdoor devices and detachably fixed with the two outdoor devices at the same time, the assembling piece comprises a front panel and two side panels, the front panel is provided with a second device mounting hole for detachable fixation with the front side of one outdoor device, and the two side panels are provided with a third device mounting hole for detachable fixation with the front side of one outdoor device.

Preferably, the third device mounting hole at the top of the side panel has a second non-closed hole with an open inlet, the second non-closed hole is an L-shaped hole, the inlet of the L-shaped hole is located at a vertical edge of the side panel, and pre-assembled locking pieces on two sides of the outdoor device can each enter from the inlet of the respective L-shaped hole and slide into the closed end of the L-shaped hole.

Preferably, the installation support further comprises a connecting piece used for connecting the side parts of the two stacked outdoor devices together, and the connecting piece comprises a plurality of fourth device mounting holes which are connected with the same side of each of the two outdoor devices.

The installation support compatible with multiple installation modes of the present disclosure has the following beneficial effects: according to the present disclosure, the outdoor device is anchored on the holding rod hanging wall integral piece by the hanging piece, where the holding rod hanging wall integral piece can be separately and detachably installed on the wall, or the holding rod hanging wall integral piece and the holding rod piece encircle together to hold the holding rod tightly, and the holding rod hanging wall integral piece is detachably fixed with the holding rod piece, in this way, hanging wall installation and holding rod installation can be realized, thereby reducing costs and simplifying on-site layout;

further, in order to facilitate the flush and flag installation of the compatible device, at least two hanging pieces can be mounted side by side on each holding rod hanging wall integral piece, the installation support may further include an assembling piece, in this way, a single set of installation supports may simultaneously meet four installation modes of outdoor device, namely, holding rod flush installation, holding rod flag installation, hanging wall flush installation, and hanging wall flag installation, which may further reduce the cost and simplify the on-site layout.

BRIEF DESCRIPTION OF THE DRAWINGS

In order for a clearer illustration of technical solutions in embodiments of the present disclosure or the conventional technology, drawings used in the description of the embodiments or the conventional technology are described briefly hereinafter. Apparently, the drawings described in the following illustrate some embodiments of the present disclosure, other drawings may be obtained by those ordinarily skilled in the art based on these drawings without any creative effort.

DETAILED DESCRIPTION OF THE EMBODIMENTS

Figure 1:
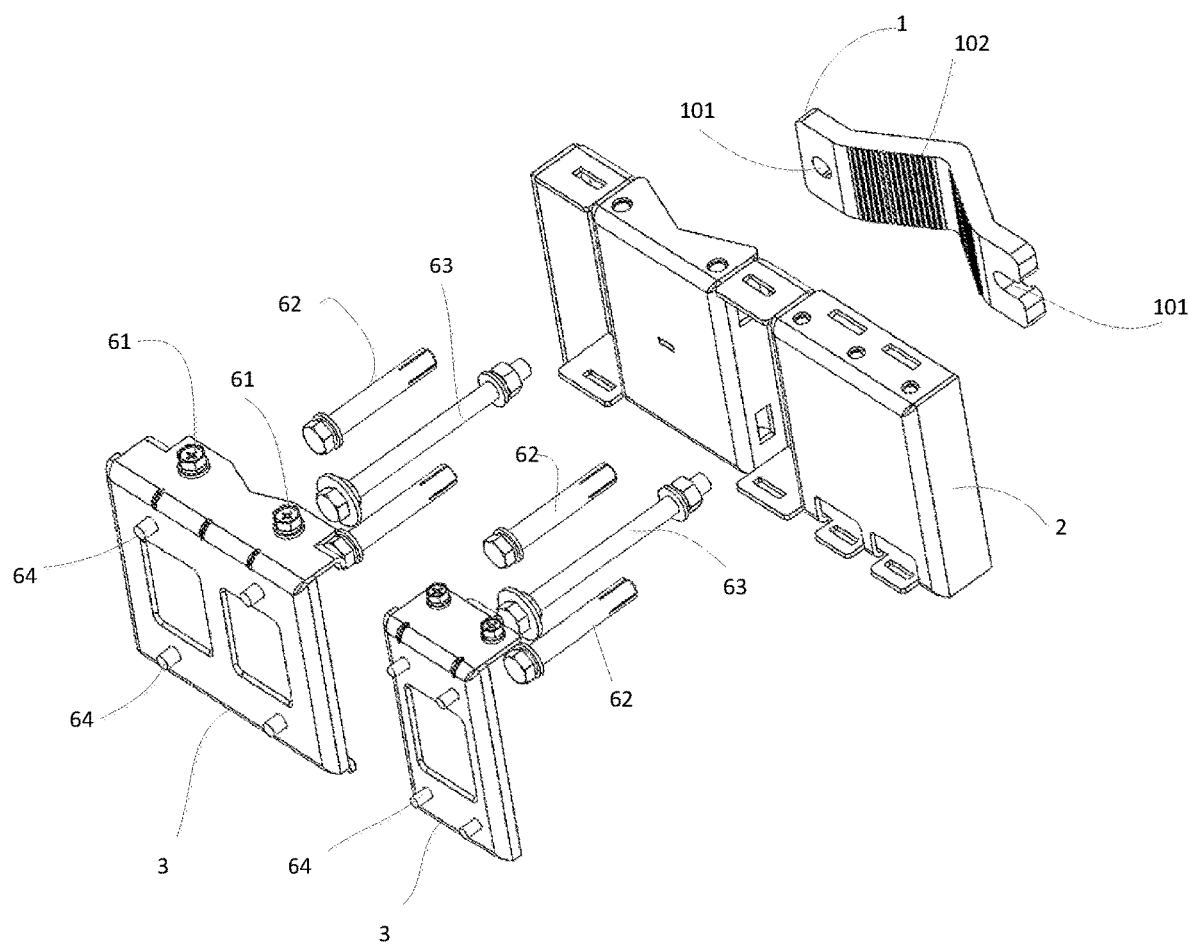
FIG. 1 is an exploded view of a first embodiment of the installation support compatible with multiple installation modes of the present disclosure.

In order to facilitate the understanding of the present disclosure, the present disclosure will be described in full details with reference to the relevant drawings. Typical embodiments of the present disclosure are shown in the drawings. However, the disclosure may be embodied in many different manners and is not limited to the embodiments described herein. Rather, these embodiments are provided to make the present disclosure more fully understood.

It should be noted that when an element is referred to as being "fixed" to the other element, it can be directly on the other element or there is an intermediate element between them. When an element is considered to be "connected" to the other element, it can be directly connected to the other element or an intermediate element is connected between them. The terms "perpendicular", "horizontal", "left", "right" and similar expressions used in this specification are for illustrative purposes only.

Unless otherwise defined, all technical and scientific terms used herein have the same meanings as commonly understood by those skilled in the technical field of the present disclosure. Terms are used in the present disclosure to describe particular embodiments and are not aimed to limit the present disclosure.

Terms including ordinal numbers such as "first" and "second" used in this specification can be used to describe various constituent elements, but these constituent elements are not limited by these terms. These terms are only used to distinguish one constituent element from other constituent elements. For example, without departing from the scope of the claims of the present disclosure, the first constituent element may be named as the second constituent element; similarly, the second constituent element may also be named as the first constituent element.

Referring to FIG. 1, the general idea of the present disclosure is: constructing an installation support compatible with multiple installation modes, including a holding rod piece 1, a holding rod hanging wall integral piece 2 and a hanging piece 3, the hanging piece 3 is used for being detachably fixed with outdoor device, where the hanging piece 3 can be detachably attached to the holding rod hanging wall integral piece 2, and the holding rod hanging wall integral piece 2 can be used for two purposes, on one hand, the holding rod hanging wall integral piece 2 can be separately and detachably mounted on the wall, on the other hand, the holding rod hanging wall integral piece 2 and the holding rod piece 1 encircle together to hold the holding rod tightly and the holding rod hanging wall integral piece 2 is detachably fixed to the holding rod piece 1. That is, when hanging wall installation is required, the holding rod piece 1 is not needed and only the holding rod hanging wall integral piece 2 and the hanging piece 3 are required; and when holding rod installation is required, the holding rod 1, the holding rod hanging wall integral piece 2 and the hanging piece 3 all need to be utilized. Therefore, by the mutual cooperation of various components, the present disclosure can adapt to different application scenarios, flexibly realize the selection of hanging wall installation and holding rod installation, reduce the cost and simplify the on-site layout.

Figure 4:
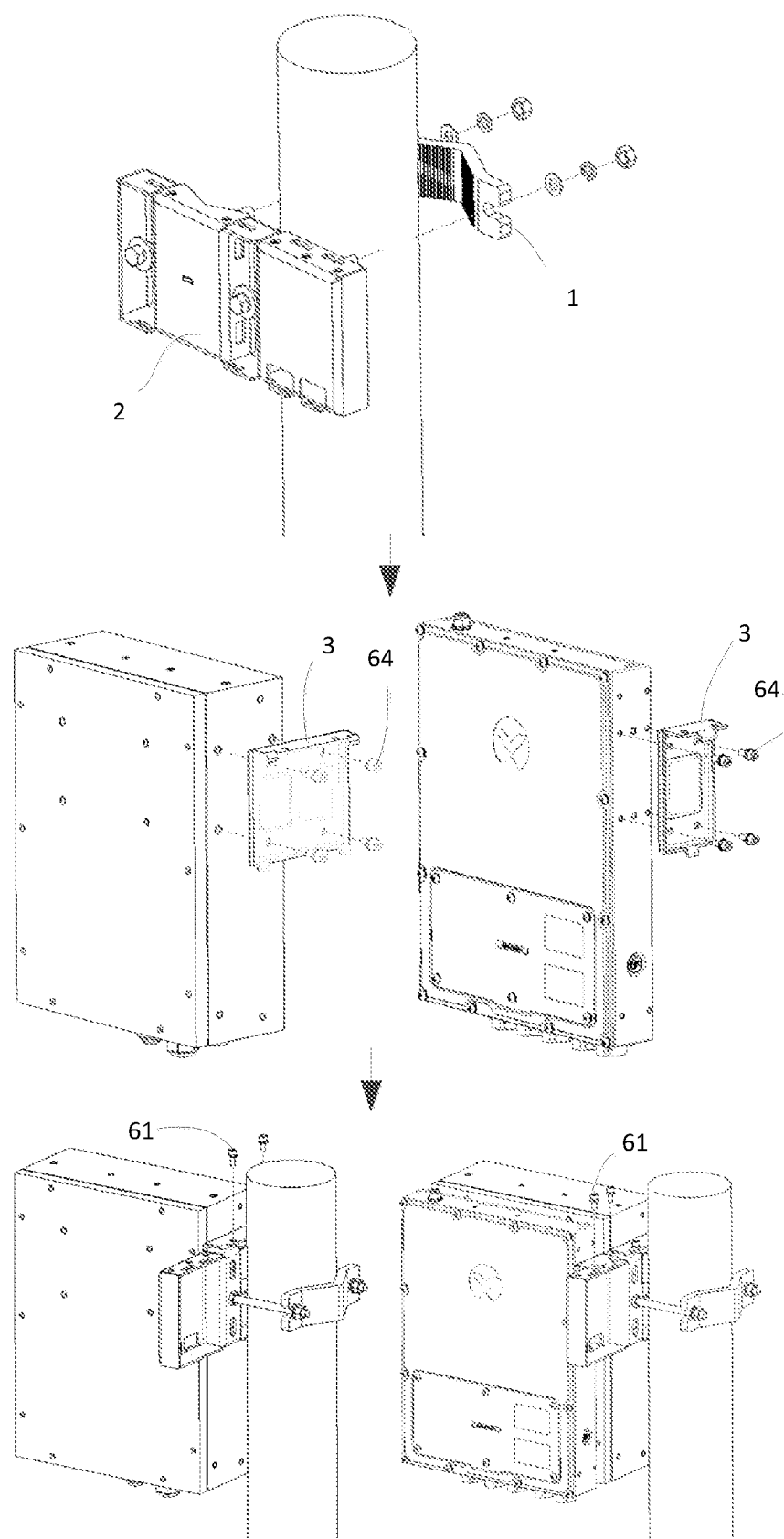
FIG. 4 is a schematic diagram of the holding rod flag installation process of the installation support.
Figure 5:
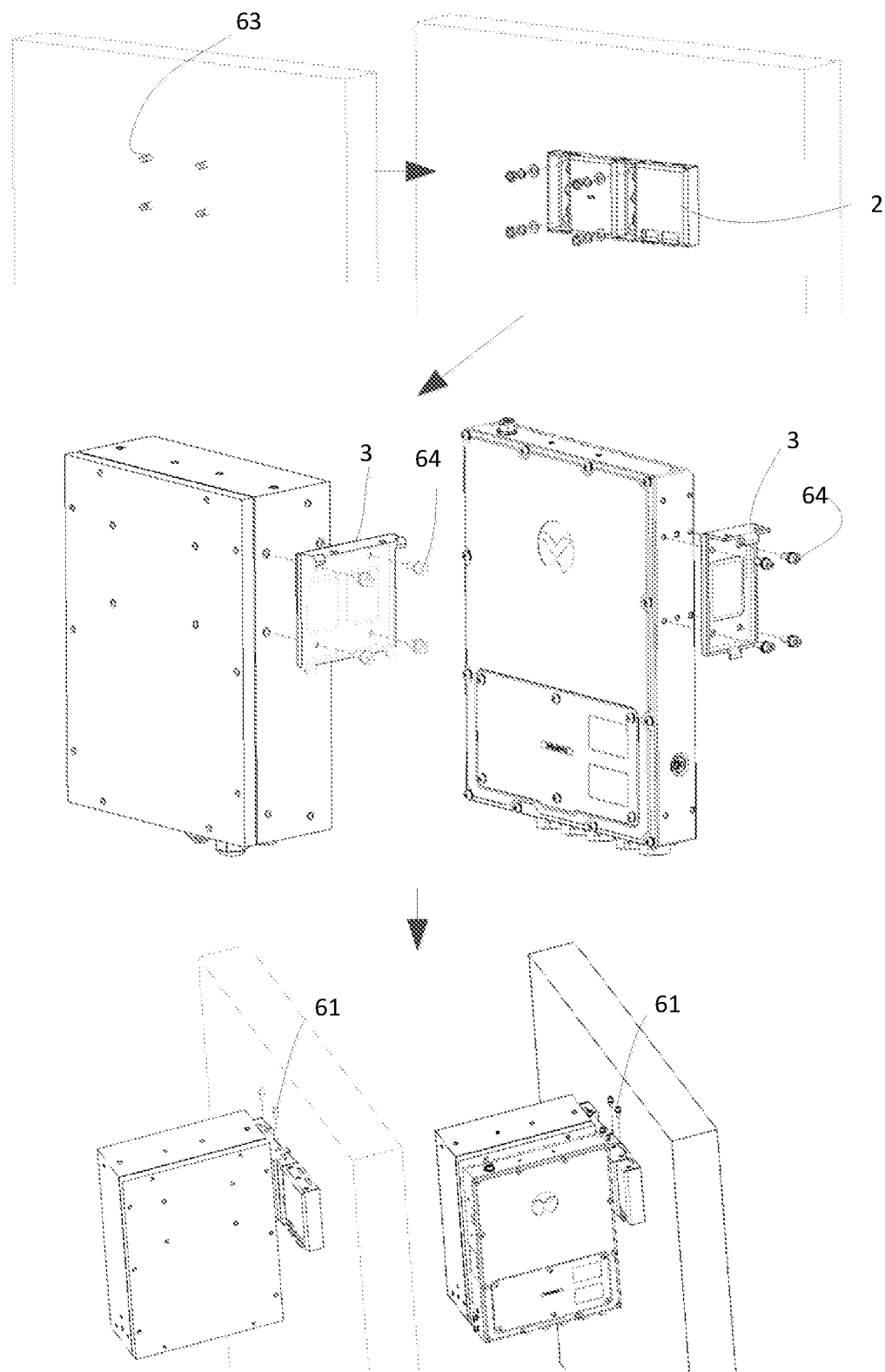
FIG. 5 is a schematic diagram of the hanging wall flag installation process of the installation support.
Figure 6:
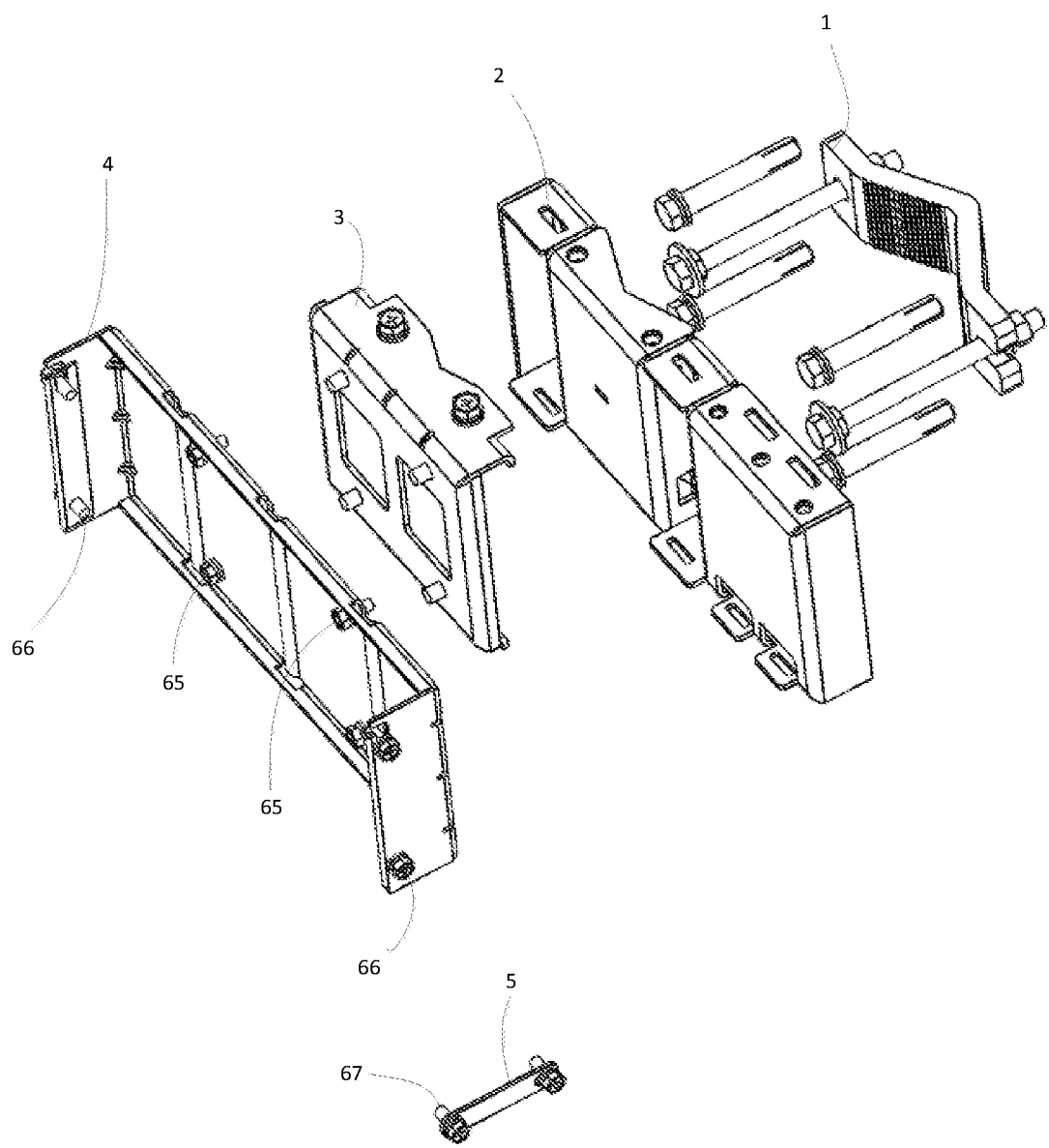
FIG. 6 is an exploded view of a second embodiment of the installation support compatible with multiple installation modes of the present disclosure.
Figure 8:
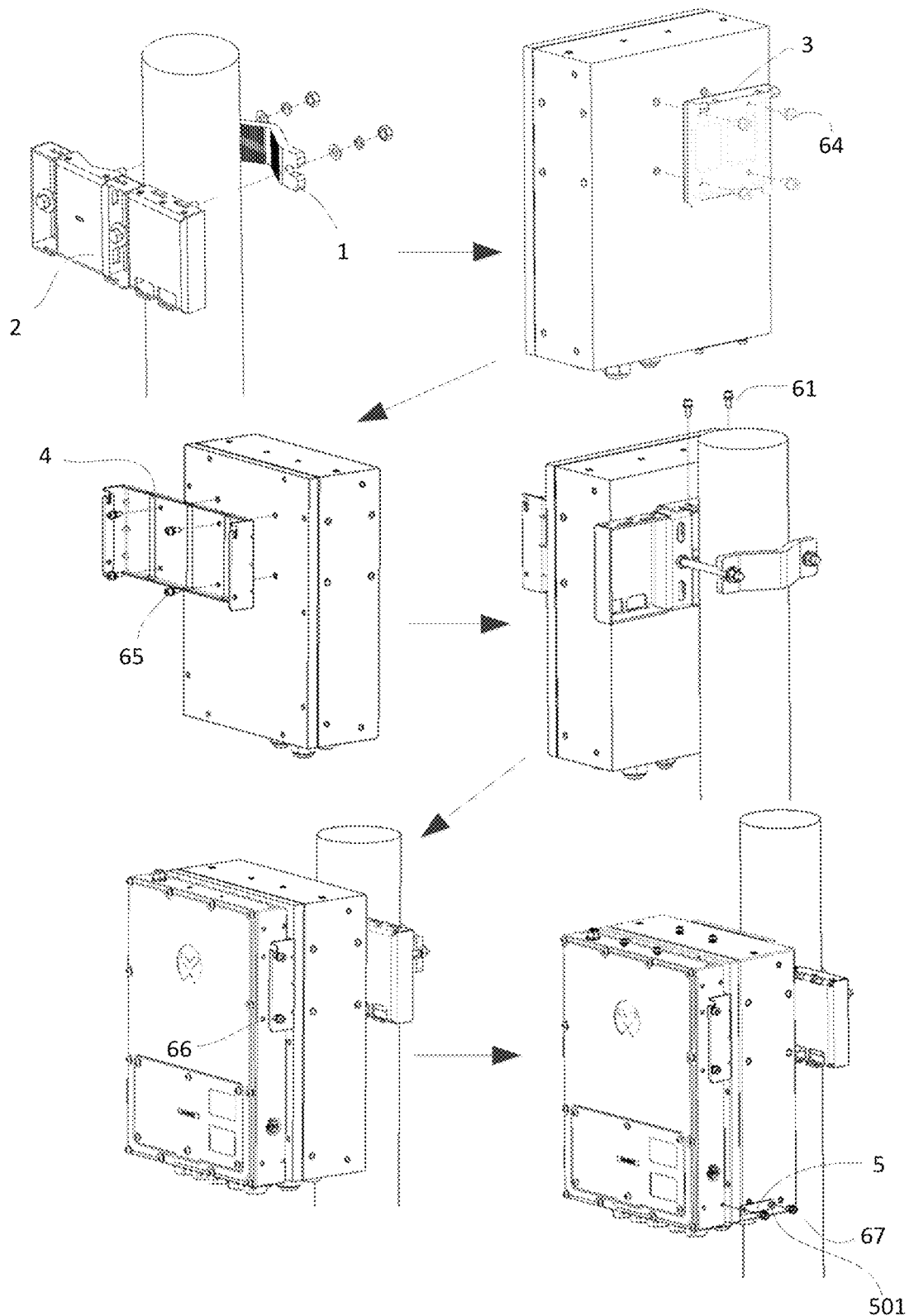
FIG. 8 is a schematic diagram of the holding rod flush installation process of the installation support.

Further, with reference to FIG. 4 and FIG. 5, the so-called flag installation refers to the installation of the device sideways and the fixed installation of one side of the device, just like hanging a flag. If there are multiple devices, as shown in FIG. 5, then multiple devices can be arranged side by side so that the side where each device is installed and fixed can be arranged side by side. Referring to FIG. 8, the so-called flush installation means that the device is installed upright, and the back of the device is fixedly installed. If there are multiple devices, multiple devices are stacked together, like a pile of books stacked one by one. Referring to FIG. 6, in order to further facilitate the flush and flag installation of the device, on one hand, at least two hanging pieces 3 can be mounted side by side on each holding rod hanging wall integral piece 2 so that the flag installation of outdoor device can be realized; on the other hand, referring to FIG. 6 and in combination with FIG. 8, the installation support may further include an assembling piece 4 and a connecting piece 5, the assembling piece 4 is arranged between two stacked outdoor devices and detachably fixed with the two outdoor devices at the same time, the connecting piece 5 connects the same side of two outdoor devices so that a single set of installation supports may simultaneously meet four installation modes of outdoor device, namely, holding rod flush installation, holding rod flag installation, hanging wall flush installation, and hanging wall flag installation, which may further reduce the cost and simplify the on-site layout.

In order to better understand the above-mentioned technical solution, the above-mentioned technical solution is explained in detail below with reference to the drawings of the Description and the embodiment. It should be understood that the embodiments of the present disclosure and the specific features in the embodiments are detailed descriptions of the technical solution of the present application, rather than limitations on the technical solution of the present application, if there is no conflict, the embodiments of the present disclosure and the technical features in the embodiments can be combined with each other.

First Embodiment

Referring to FIG. 1, the installation support of this embodiment includes a holding rod piece 1, a holding rod hanging wall integral piece 2, a hanging piece 3 and various locking pieces for locking the holding rod piece 1 with the holding rod hanging wall integral piece 2 and locking the holding rod hanging wall integral piece 2 with the hanging piece 3.

The hanging piece 3 is used for being detachably fixed with outdoor device, and the hanging piece 3 can be detachably attached to the holding rod hanging wall integral piece 2, at least two hanging pieces 3 can be mounted side by side on each holding rod hanging wall integral piece 2, the holding rod hanging wall integral piece 2 is detachably fixed with the holding rod piece 1, and the holding rod hanging wall integral piece 2 and the holding rod piece 1 encircle together to hold the holding rod tightly. In addition to cooperating with the holding rod to realize the installation mode of holding rod installation, the holding rod hanging wall integral piece 2 of this embodiment may also be used separately for hanging wall installation. With regards to this, referring to FIG. 2, a hanging wall mounting hole 205 is provided on the holding rod hanging wall integral piece 2, where the hanging wall mounting hole 205 is matched with an expansion screw 63 driven into the wall to realize the hanging wall installation of the holding rod hanging wall integral piece 2.

Figure 2:
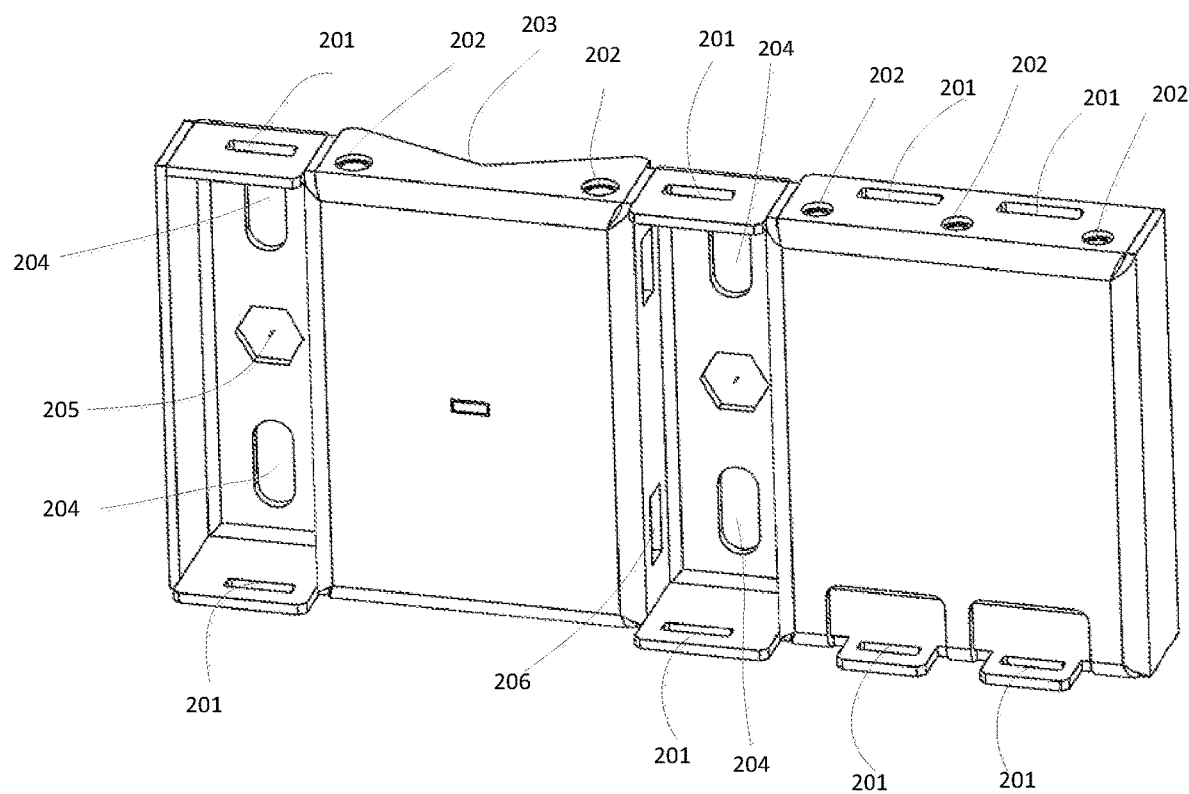
FIG. 2 is a structural schematic diagram of a holding rod hanging wall integral piece.
Figure 3:
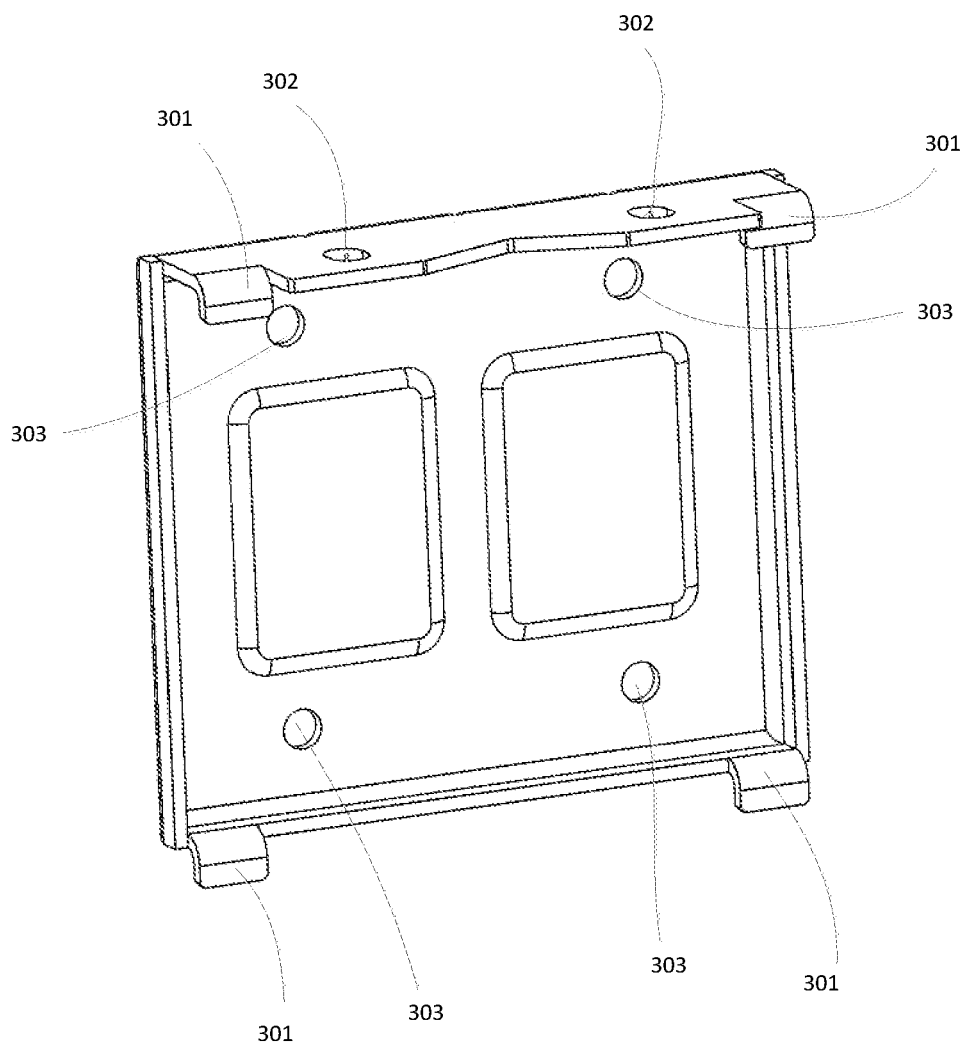
FIG. 3 is a structural schematic diagram of a hanging piece.

With reference to FIG. 2 to FIG. 3, multiple first device mounting holes 303 for connecting to the outdoor device are provided on the hanging pieces 3, the hanging piece 3 further includes a downward bending hook lug 301, a hook lug positioning groove 201 is provided on the holding rod hanging wall integral piece 2, and the hook lug 301 hangs into the hook lug positioning groove 201. The safety of separate hanging is not high, so in this embodiment, the first assembly hole 302 is provided in the hanging piece 3, a second assembly hole 202 is provided on the holding rod hanging wall integral piece 2, where the hanging piece 3 and the holding rod hanging wall integral piece 2 are detachably fixed by a locking piece (for example, a screw 61) passing through the first assembly hole 302 and the second assembly hole 202. The holding rod hanging wall integral piece 2 includes a notch 203 for being attached with the holding rod, and the holding rod piece 1 includes an arched surface 102 for being attached with the holding rod, a third assembly hole 204 is provided on the holding rod hanging wall integral piece 2, and fourth assembly holes 101 are provided on both sides of the arched surface 102 of the holding rod piece 1 respectively, where holding rod piece 1 and the holding rod hanging wall integral piece 2 are detachably fixed by a locking piece (for example, a screw 62) passing through the third assembly hole 204 and the fourth assembly hole 101, so that the notch 203 and the arched surface 102 encircle together to hold the holding rod tightly.

Specifically, referring to FIG. 1, the holding rod piece 1 is about a strip-shaped curved panel arched in the middle, and its two ends are provided with fourth assembly holes 101; the middle arched surface 102 is used for adhering to the holding rod, and the arched surface 102 is provided with a friction structure for increasing friction, the friction structure may be various patterns, such as vertical stripes in this embodiment. The shape of the arched surface 102 is not limited to arc, triangle, etc. Preferably, one of the fourth assembly holes 101 is a first non-closed hole with an open inlet, and the inlet of the first non-closed hole is located at a vertical edge of the holding rod piece 1, where the locking piece fixed on the holding rod hanging wall integral piece 2 can enter from the inlet of the first non-closed hole and slide into a closed end of the first non-closed hole.

Specifically, referring to FIG. 1, in this embodiment, two hanging pieces 3 can be mounted side by side on each holding rod hanging wall integral piece 2, and the two hanging pieces 3 have different widths, of course, in other embodiments, the number of hanging pieces 3 may be multiple, and the sizes may be the same or different. In this embodiment, the dimension of the first assembly hole 302 of the larger hanging piece 3 is larger than the dimension of the first assembly hole 302 of the smaller hanging piece 3. The number of hook lug 301 of larger hanging piece 3 is greater than the number of hook lug 301 of smaller hanging piece 3. If only one outdoor device is required to be installed, the hanging wall installation or holding rod installation can be realized only by using the larger hanging piece 3; and if two outdoor devices need to be installed, two hanging pieces 3 can be selected to use at the same time.

Referring to FIG. 3, the larger hanging piece 3 is taken as an example for specific explanation, and the larger hanging piece 3 generally includes a main panel and a top panel, the top of the main panel is perpendicularly connected with the top panel, four first device mounting holes 303 are provided at the four corners of the main panel, two first assembly holes 302 are provided at the top panel. Two hook lugs 301 bent downward extend from the bottom edge of the main panel, two hook lugs 301 bent downward extend from the edge of the top panel, that is, a total of four hook lugs 301, the upper two hook lugs 301 play the role of anchoring, while the bottom two hook lugs 301 mainly play the role of positioning.

Specifically, referring to FIG. 2, the holding rod hanging wall integral piece 2 includes a main body plate, a top plate and a bottom plate, the top plate and the bottom plate are connected with the upper and lower edges of the main body plate. The main body plate further includes two wide panels, two narrow panels and multiple side plates, the wide and narrow panels are parallel but staggered back and forth, and the side plates are perpendicular to the wide and narrow panels, two hanging pieces 3 are arranged directly opposite to the two front panels during installation respectively, the wide panel is close to the hanging piece 3, and the narrow panel is relatively far away from the hanging piece 3, the two wide panels and two narrow panels are spaced apart, the wide panel is connected with the adjacent narrow panel by a side plate, and two pairs of throat hoop limiting holes 206 can be provided on the two side plates between the wide panel and the narrow panel, each pair of throat hoop limiting holes 206 are used for one throat hoop holding the holding rod tightly to pass through and the strength of holding rod can be further enhanced by using the throat hoop.

With further reference to FIG. 2, the two narrow panels are provided with two upper and lower third assembly holes 204 and a hanging wall mounting hole 205 between the two third assembly holes 204, and the third assembly hole 204 is a long waist hole. Two hook lug positioning grooves 201 are provided in the part of the top plate connected with the two narrow panels, and two hook lug positioning grooves 201 are provided in the part of the bottom plate connected with the two narrow panels, two second assembly holes 202 with larger sizes are provided in the part of the top plate connected with the wide panel between the two narrow panels, and the part between the two second assembly holes 202 is recessed to form a notch 203. The part of the bottom plate connected with the wide panel between the two narrow panels is also recessed to form a notch which is consistent with the notch 203 of the top plate. After the hook lug 301 of the larger hanging piece 3 is matched with the hook lug positioning groove 201, the top panel of the hanging piece 3 covers the top plate of the holding rod hanging wall integral piece 2, and the first assembly hole 302 is kept aligned with the second assembly hole 202, meanwhile, the top panel of the hanging piece 3 also leaves a notch which is consistent with the notch 203 on the top plate of the holding rod hanging wall integral piece 2. Similarly, a hook lug positioning groove 201 and a second assembly hole 202 with a smaller size are provided in the part of the top plate of the holding rod hanging wall integral piece 2 connected with the other wide panel, a hook lug positioning groove 201 is also provided in the part of the bottom plate connected with the other wide panel. After the hook lug 301 of the smaller hanging piece 3 is matched with the hook lug positioning groove 201, the top panel of the hanging piece 3 covers the top plate of the holding rod hanging wall integral piece 2, and meanwhile, the first assembly hole 302 is kept aligned with the second assembly hole 202.

It should be noted that in this embodiment, the number and position of various assembly holes and mounting holes can be adjusted according to requirements, and this embodiment is only schematic.

Two installation methods of this embodiment are described below.

Referring to FIG. 4, the flag installation process of the holding rod is as follows: the holding rod hanging wall integral piece 2 and the holding rod piece 1 are mounted on the holding rod; the two hanging pieces 3 are then mounted to one side of each of the two outdoor devices respectively and the screws 64 are locked; then the two outdoor devices are hung on the holding rod hanging wall integral piece 2 by the hanging pieces 3 thereon, and locked and fixed by screws 61.

Referring to FIG. 5, the flag installation process of the hanging wall is as follows: the expansion screw 63 is drilled and driven into the wall according to the hole spacing of the hanging wall mounting hole 205 of the holding rod hanging wall integral piece 2, then the holding rod hanging wall integral piece 2 is mounted on the expansion screw 63 and the nut is locked, and the two hanging pieces 3 are mounted to one side of each of the two outdoor devices respectively and the screws 64 are locked; then the two outdoor devices are hung on the holding rod hanging wall integral piece 2 by the hanging pieces 3 thereon, and locked and fixed by screws 61.

Second Embodiment

Referring to FIG. 6, this embodiment adds an assembling piece 4 and a connecting piece 5 on the basis of the first embodiment. The assembling piece 4 is arranged between two stacked outdoor devices and detachably fixed with the two outdoor devices at the same time; the connecting piece 5 is used for connecting the side parts of two stacked outdoor devices together.

Figure 7:
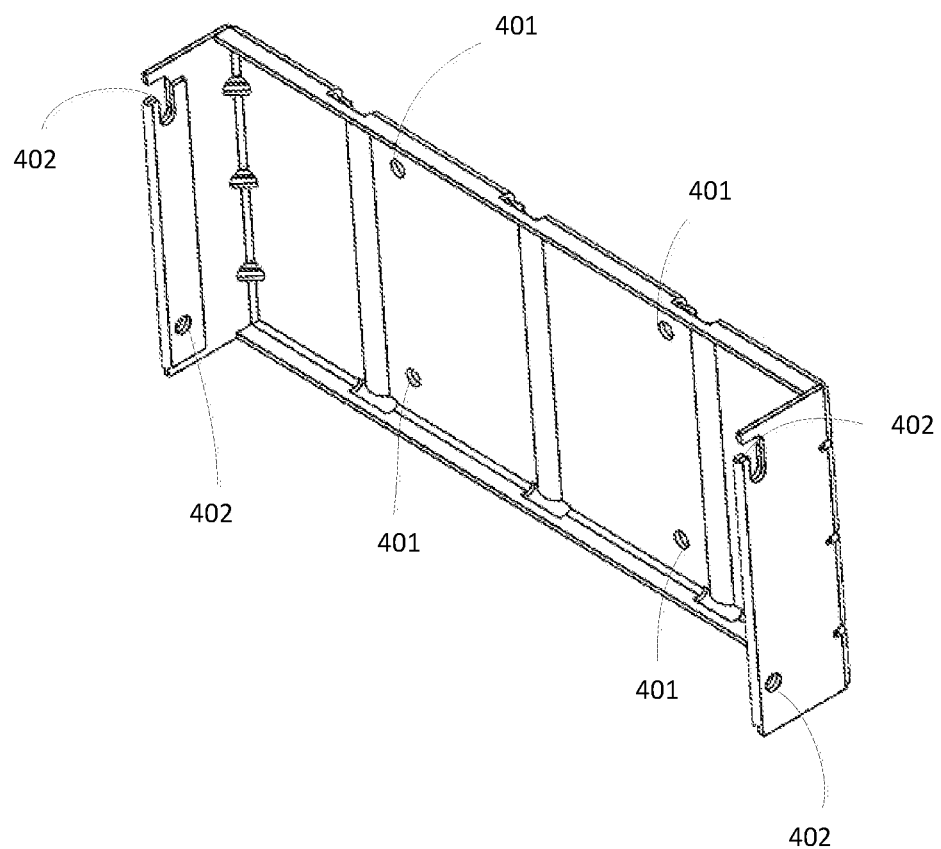
FIG. 7 is a structural schematic diagram of an assembling piece.

Referring to FIG. 7, the assembling piece 4 includes a front panel and two side panels perpendicularly connected to both sides of the front panel, a second device mounting hole 401 is provided on the front panel, and third device mounting holes 402 are provided on the two side panels, the second device mounting hole 401 on the front panel is used to be detachably fixed with the front side of one of the outdoor devices, such as by bolts 65. The third device mounting holes 402 on the two side panels are used to be detachably fixed with the two sides of the other outdoor device, such as by bolts 66.

Preferably, the third device mounting hole 402 at the top of the side panel has a second non-closed hole with an open inlet, where the second non-closed hole is an L-shaped hole, and the inlet of the L-shaped hole is located at a vertical edge of the side panel, pre-assembled locking pieces on each side of the outdoor device can enter and slide into the closed end of the L-shaped hole through the inlet of the corresponding L-shaped hole, respectively. In this way, the two screws fixing the two side panels of the assembling piece 4 can be pre-assembled on the outdoor device, and then the outdoor device can be hung on the assembling piece 4 by the two screws, L-shaped hole is used to prevent falling.

The connecting piece 5 is a narrow sheet, including multiple fourth device mounting holes 501 which are respectively connected with the same side of two outdoor devices, for example, the connecting piece is fixed to one side of the outdoor device by bolts 67 passing through the fourth device mounting holes 501.

The material of each part of this embodiment is ordinary steel plate, which can meet the requirements of seismic test by bending, welding and other processes.

Two new installation methods of this embodiment compared with the first embodiment are described as follows.

Referring to FIG. 8, the flush installation process of the holding rod is as follows: the holding rod hanging wall integral piece 2 and the holding rod piece 1 are mounted on the holding rod, this step is not illustrated in FIG. 8; the larger hanging piece 3 is then mounted to the back of one of the outdoor devices and the screws 64 are locked; the assembling piece 4 is mounted on the front side of the outdoor device, and the screws 65 are locked; then the outdoor device is hung on the holding rod hanging wall integral piece 2 by the hanging pieces 3 thereon, and locked and fixed by screws 61; the other outdoor device is mounted on the assembling piece 4 and fixed by the side screws 66; a connecting piece 5 is mounted at the lower part of the side of the outdoor device, and the screw 67 is locked.

The process of hanging wall flush installation is similar to the process of holding rod flush installation, the only difference is that hanging wall flush installation is equivalent to changing the first step of holding rod flush installation to hanging wall installation, so the process of hanging wall flush installation is not repeated here.

The embodiments of the present disclosure have been described above with reference to the drawings, but the present disclosure is not limited to the above-mentioned specific embodiments, the above-mentioned specific embodiments are only illustrative, not restrictive, under the inspiration of this disclosure, those of ordinary skill in the art can make many forms without departing from the purpose of this disclosure and the scope of protection of the claims, all of which are within the protection of this disclosure.

The invention claimed is:

1. An installation support compatible with multiple installation modes, characterized by comprising a holding rod piece, a holding rod hanging wall integral piece and a hanging piece for detachable fixation with outdoor devices; wherein the hanging piece is detachably attached to the holding rod hanging wall integral piece; wherein the holding rod hanging wall integral piece can be separately and detachably installed on a wall, or the holding rod hanging wall integral piece and the holding rod piece encircle together to hold a holding rod tightly and the holding rod hanging wall integral piece is detachably fixed with the holding rod piece, wherein each holding rod hanging wall integral piece can be mounted with at least two hanging pieces side by side, the hanging piece is provided with a plurality of first device mounting holes for connecting to the outdoor device, the hanging piece further comprises a downward bending hook lug, the holding rod hanging wall integral piece is provided with a hook lug positioning groove, and the hook lug hangs into the hook lug positioning groove.

2. The installation support compatible with multiple installation modes according to claim 1, characterized in that the hanging piece is provided with a first assembly hole, the holding rod hanging wall integral piece is provided with a second assembly hole, and the hanging piece and the holding rod hanging wall integral piece are detachably fixed by a locking piece passing through the first assembly hole and the second assembly hole.

3. The installation support compatible with multiple installation modes according to claim 1, characterized in that the holding rod hanging wall integral piece is provided with a hanging wall mounting hole, and the hanging wall mounting hole is matched with an expansion screw driven into the wall to realize a hanging wall installation of the holding rod hanging wall integral piece.

4. The installation support compatible with multiple installation modes according to claim 1, characterized in that the holding rod hanging wall integral piece comprises a notch for being attached with the holding rod, the holding rod piece comprises an arched surface for being attached with the holding rod, the arched surface is provided with a friction structure for increasing friction, the holding rod hanging wall integral piece is provided with a third assembly hole, the holding rod piece is provided with a fourth assembly hole on each of two sides of the arched surface, and the holding rod piece and the holding rod hanging wall integral piece are detachably fixed by a locking piece passing through the third assembly hole and the fourth assembly hole so that the notch and the arched surface encircle together to hold the holding rod tightly.

5. The installation support compatible with multiple installation modes according to claim 4, characterized in that one of the fourth assembly holes is a first non-closed hole with an open inlet, the inlet of the first non-closed hole is located at a vertical edge of the holding rod piece, and the locking piece fixed on the holding rod hanging wall integral piece can enter from the inlet of the first non-closed hole and slide into a closed end of the first non-closed hole.

6. The installation support compatible with multiple installation modes according to claim 1, characterized in that the holding rod hanging wall integral piece is further provided with at least one pair of throat hoop limiting holes, and each pair of throat hoop limiting holes are used for one throat hoop for holding the holding rod tightly to pass through.

7. The installation support compatible with multiple installation modes according to claim 1, characterized in that the installation support further comprises an assembling piece which is arranged between two stacked outdoor devices and detachably fixed with the two outdoor devices at the same time, the assembling piece comprises a front panel and two side panels, the front panel is provided with a second device mounting hole for detachable fixation with the front side of one outdoor device, and the two side panels are provided with a third device mounting hole for detachable fixation with the front side of one outdoor device.

8. The installation support compatible with multiple installation modes according to claim 7, characterized in that the third device mounting hole at the top of the side panel has a second non-closed hole with an open inlet, the second non-closed hole is an L-shaped hole, the inlet of the L-shaped hole is located at a vertical edge of the side panel, and pre-assembled locking pieces on two sides of the outdoor device can each enter from the inlet of the respective L-shaped hole and slide into the closed end of the L-shaped hole.

9. The installation support compatible with multiple installation modes according to claim 7, characterized in that the installation support further comprises a connecting piece used for connecting the side parts of the two stacked outdoor devices together, and the connecting piece comprises a plurality of fourth device mounting holes which are connected with the same side of each of the two outdoor devices.

10. An installation support compatible with multiple installation modes, characterized by comprising a holding rod piece, a holding rod hanging wall integral piece and a hanging piece for detachable fixation with outdoor devices; wherein the hanging piece is detachably attached to the holding rod hanging wall integral piece; wherein the holding rod hanging wall integral piece can be separately and detachably installed on a wall, or the holding rod hanging wall integral piece and the holding rod piece encircle together to hold a holding rod tightly and the holding rod hanging wall integral piece is detachably fixed with the holding rod piece, wherein the holding rod hanging wall integral piece comprises a notch for being attached with the holding rod, the holding rod piece comprises an arched surface for being attached with the holding rod, the arched surface is provided with a friction structure for increasing friction, the holding rod hanging wall integral piece is provided with a third assembly hole, the holding rod piece is provided with a fourth assembly hole on each of two sides of the arched surface, and the holding rod piece and the holding rod hanging wall integral piece are detachably fixed by a locking piece passing through the third assembly hole and the fourth assembly hole so that the notch and the arched surface encircle together to hold the holding rod tightly.

11. An installation support compatible with multiple installation modes, characterized by comprising a holding rod piece, a holding rod hanging wall integral piece and a hanging piece for detachable fixation with outdoor devices; wherein the hanging piece is detachably attached to the holding rod hanging wall integral piece; wherein the holding rod hanging wall integral piece can be separately and detachably installed on a wall, or the holding rod hanging wall integral piece and the holding rod piece encircle together to hold a holding rod tightly and the holding rod hanging wall integral piece is detachably fixed with the holding rod piece, wherein the installation support further comprises an assembling piece which is arranged between two stacked outdoor devices and detachably fixed with the two outdoor devices at the same time, the assembling piece comprises a front panel and two side panels, the front panel is provided with a second device mounting hole for detachable fixation with the front side of one outdoor device, and the two side panels are provided with a third device mounting hole for detachable fixation with the front side of one outdoor device.

\* \* \* \* \*